US012687925B2

(12) United States Patent
Babaie et al.

(10) Patent No.: US 12,687,925 B2
(45) Date of Patent: Jul. 21, 2026

(54) CAMERA-LESS EYE TRACKING SYSTEM

(71) Applicant: Apple Inc., Cupertino, CA (US)

(72) Inventors: Gelareh Babaie, Belmont, CA (US);
Manohar B Srikanth, Mountain View,
CA (US); Yanli Zhang, Los Altos, CA
(US); Navid Afsarifard, Atherton, CA
(US); Sundeep K Jolly, San Francisco,
CA (US); Moinul H Khan, San Jose,
CA (US); Arthur Y Zhang, San Jose,
CA (US); Ray L Chang, Saratoga, CA
(US); Axit H Patel, Sunnyvale, CA
(US); Antonio A Gellineau, Santa
Clara, CA (US)

(73) Assignee: Apple Inc., Cupertino, CA (US)

( * ) Notice: Subject to any disclaimer, the term of this
patent is extended or adjusted under 35
U.S.C. 154(b) by 0 days.

(21) Appl. No.: 18/944,344

(22) Filed: Nov. 12, 2024

(65) Prior Publication Data

US 2025/0181155 A1     Jun. 5, 2025

Related U.S. Application Data

(60) Provisional application No. 63/606,143, filed on Dec.
5, 2023.

(51) Int. Cl.
G06F 3/01          (2006.01)
G06T 7/73          (2017.01)
(52) U.S. Cl.
CPC .............. G06F 3/013 (2013.01); G06T 7/73
(2017.01); *G06T 2207/30041* (2013.01)
(58) Field of Classification Search
CPC .. G06F 3/013; G06T 7/73; G06T 2207/30041
See application file for complete search history.

(56) References Cited

U.S. PATENT DOCUMENTS 5,583,795 A     12/1996  Smyth
5,861,940 A     1/1999  Robinson et al.
(Continued)

FOREIGN PATENT DOCUMENTS

CN        108369653 A1      8/2018
CN        219065950 U       5/2023
(Continued)

OTHER PUBLICATIONS

Nagamatsu, T. et al., "Gaze Estimation Method based on an
Aspherical Model of the Cornea: Surface of Revolution about the
Optical Axis of the Eye," Symposium on Eye-Tracking Research &
Applications, ETRA 2010, ACM Press, New York, NY, pp. 255-258
(Mar. 22, 2010) 2010.
(Continued)

*Primary Examiner* — Mihir K Rayan
(74) *Attorney, Agent, or Firm* — Thompson Hine LLP

(57)          ABSTRACT
Various implementations disclosed herein include electronic
devices, systems, and methods that determine a character-
istic of an eye based on detecting reflections of light. An
example electronic device may include a scanning light
source capable, a set of one or more photodiodes, a refrac-
tive/diffractive medium, and a processor. The refractive/
diffractive medium includes a near-eye side and a far-eye
side, and when the electronic device is worn, the near-eye
side is proximate an eye of the user and the far-eye side is
an opposite side of the refractive/diffractive medium such
that light projected by the scanning light source that is
reflected by the eye passes through the refractive/diffractive
medium before capture by the set of one or more photo-
diodes. The processor may be configured to receive sensor
data from the set of one or more photodiodes and determine
a characteristic of the eye based on the sensor data.

24 Claims, 8 Drawing Sheets

(56) References Cited

U.S. PATENT DOCUMENTS

| | | | |
|---|---|---|---|
| 6,120,461 | A | 9/2000 | Smyth |
| 8,824,779 | B1 | 9/2014 | Smyth |
| 8,878,749 | B1 | 11/2014 | Wu et al. |
| 10,126,815 | B2 * | 11/2018 | Vidal ....................... G01S 17/88 |
| 10,317,672 | B2 | 6/2019 | Sarkar |
| 10,802,289 | B2 | 10/2020 | Takagi et al. |
| 11,022,809 | B1 * | 6/2021 | Richards ............ G02B 27/0093 |
| 11,402,901 | B2 * | 8/2022 | Nouri ....................... G06F 3/013 |
| 11,513,591 | B2 | 11/2022 | Koo |
| 11,662,814 | B2 * | 5/2023 | Sun .................... G02B 27/0093 |
| | | | 345/29 |
| 11,826,103 | B2 * | 11/2023 | Gibson .................... G06F 3/013 |
| 2004/0243113 | A1 | 12/2004 | Sugiura |
| 2008/0074614 | A1 | 3/2008 | Leblanc et al. |
| 2015/0323990 | A1 * | 11/2015 | Maltz ................. G02B 27/0179 |
| | | | 345/173 |
| 2016/0166146 | A1 | 6/2016 | Sarkar |
| 2016/0180143 | A1 | 6/2016 | Horesh |
| 2016/0223987 | A1 * | 8/2016 | Park ..................... G03H 1/0808 |
| 2016/0349515 | A1 | 12/2016 | Alexander |
| 2017/0092007 | A1 | 3/2017 | Goldberg et al. |
| 2018/0196509 | A1 | 7/2018 | Trail |
| 2019/0004323 | A1 | 1/2019 | Alexander et al. |
| 2019/0156100 | A1 | 5/2019 | Rougeaux et al. |
| 2019/0222830 | A1 | 7/2019 | Edwin |
| 2020/0278539 | A1 | 9/2020 | Petljanski |
| 2021/0068652 | A1 | 3/2021 | Nistico |
| 2021/0106219 | A1 * | 4/2021 | Gibson ................... G06F 3/013 |
| 2023/0333640 | A1 | 10/2023 | Tal et al. |
| 2025/0113998 | A1 | 4/2025 | Nistico |
| 2025/0216671 | A1 * | 7/2025 | Caspi ................. G02B 27/0093 |

FOREIGN PATENT DOCUMENTS

| | | |
|---|---|---|
| JP | 2006320749 A | 11/2006 |
| WO | WO2017066296 A1 | 4/2017 |
| WO | 2020201806 A1 | 10/2020 |

OTHER PUBLICATIONS

Zafar, Abdullah, Calderon, Claudia Martin, Yeboah, Ann Marie, Dalton, Kristine, Irving, Elizabeth and Niechwiej-Szwedo, Ewa; "Investigation of Camer-Free Eye Tracking Glasses Compared to a Video-Based System", Sep. 8, 2023; pp. 1-18.

* cited by examiner

600

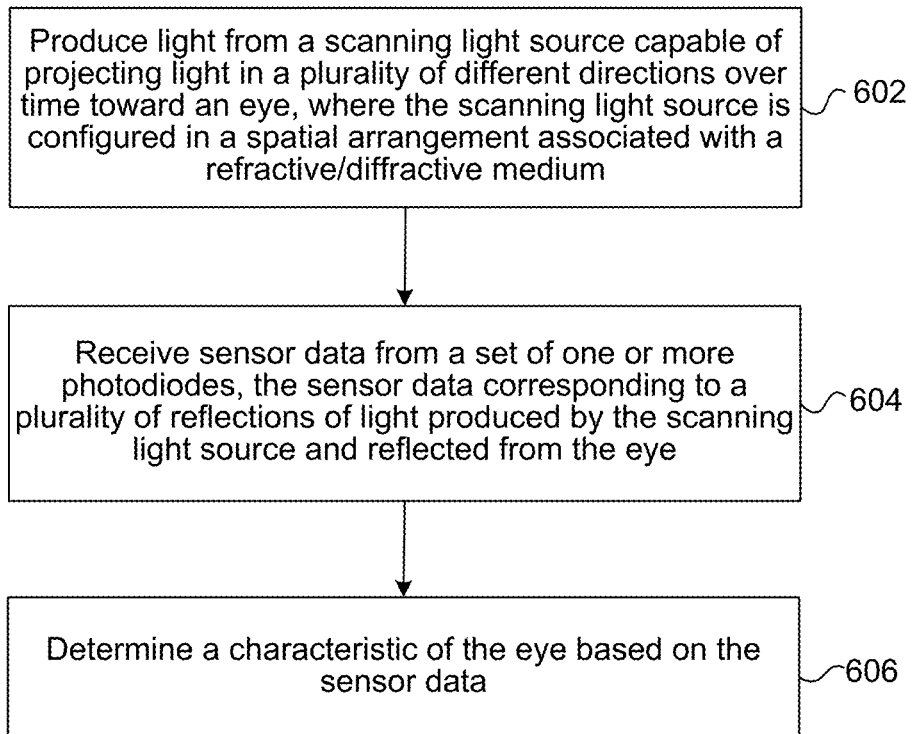

Produce light from a scanning light source capable of projecting light in a plurality of different directions over time toward an eye, where the scanning light source is configured in a spatial arrangement associated with a refractive/diffractive medium ⟋ 602

Receive sensor data from a set of one or more photodiodes, the sensor data corresponding to a plurality of reflections of light produced by the scanning light source and reflected from the eye ⟋ 604

Determine a characteristic of the eye based on the sensor data ⟋ 606

FIG. 6

Device 700

Processing Unit(s) 702

Comm. Interface(s) 708

Display(s) 712

Memory 720

Operating System 730

Instruction Set(s) 740

Illumination Analysis Instruction Set 742

Eye Characteristic Instruction Set 744

704

I/O Device(s) & Sensor(s) 706

Programming Interface(s) 710

Image Sensor System(s) 714

CAMERA-LESS EYE TRACKING SYSTEM

CROSS-REFERENCE TO RELATED APPLICATIONS

This application claims the benefit of U.S. Provisional Application Ser. No. 63/606,143 filed Dec. 5, 2023, which is incorporated herein in its entirety.

TECHNICAL FIELD

The present disclosure generally relates to electronic devices, and in particular, to systems, methods, and devices for determining eye characteristics of users of electronic devices.

BACKGROUND

Existing eye-tracking techniques analyze glints that are reflected off of a user's eye and captured via an image sensor (e.g., a camera). Some head mounted systems may include eye-tracking techniques that project light via a scanning light source and capture reflections of the light off an eye via a set of sensors that are located in front of the lens. The eye-tracking system may lack accuracy, require more than one camera to capture a sufficient number of glints, and require eye camera placement that is suboptimal for capturing a sufficient number of glints. Thus, it may be desirable to provide a means of efficiently positioning of light sources to produce glints for assessing an eye characteristic (e.g., gaze direction, eye orientation, identifying an iris of the eye, etc.) for head mountable systems and not using one or more cameras.

SUMMARY

Various implementations disclosed herein include devices, systems, and methods that track an eye by projecting light via a scanning light source and capturing reflections of the light off an eye via a set of photodiodes, thus does not require a camera to capture the reflections. The camera-less eye tracking system may be used for inside refractive or diffractive media, for example behind the covered glass or lens, behind an optical module, or any other refractive and/or diffractive material. The device may be a head mounted device (HMD) such as a device that is worn around the head of a user, or the HMD may be a pair of augmented reality glasses. Tracking the eye may include identifying and tracking a position and/or orientation of an eye, a gaze direction, the cornea shape, and the like. The scanning light source may be a projection component that may include a micro-electromechanical system (MEMS) scanner or the like.

In some implementations, the photodiodes may be placed behind, in front of, or embedded within a refractive/diffractive medium (e.g., a transparent substrate, such as a lens, optical module (OM), cover glass, grating, and the like). For example, the photodiodes may be positioned on the display side of a lens that is positioned between an eye and a display. By positioning the photodiodes on the display side of a refractive/diffractive medium will then account for any effect(s) of the refractive/diffractive medium on the reflections (e.g., light reflections that may vary based on passing through a lens). The projection component (e.g., MEMS scanner, or the like) may also be positioned behind, in front of, or embedded within a refractive/diffractive medium. In some implementations, the device may further include a polarizer (e.g., an adaptive polarization control unit) to improve signal to noise ratio and as a result improve accuracy. In some implementations, the device may be able to detect depth, for example, using a spatial light module in front of the MEMS scanner to provide phase information from which 3D depth may be determined and used for various applications.

In general, one innovative aspect of the subject matter described in this specification can be embodied in an electronic device that includes a scanning light source capable of projecting light in a plurality of different directions over time, a set of one or more photodiodes, a refractive/diffractive medium having a near-eye side and a far-eye side, wherein, when the electronic device is worn, the near-eye side is proximate an eye of the user and the far-eye side is an opposite side of the refractive/diffractive medium such that light projected by the scanning light source that is reflected by the eye passes through the refractive/diffractive medium before capture by the set of one or more photodiodes, and a processor configured to perform operations. The operations include receiving sensor data from the set of one or more photodiodes, the sensor data corresponding to a plurality of reflections of light produced by the scanning light source and reflected from the eye, and determining a characteristic of the eye based on the sensor data.

In general, another innovative aspect of the subject matter described in this specification can be embodied in methods, at an electronic device having a processor, that include the actions of producing light from a scanning light source capable of projecting light in a plurality of different directions over time toward an eye, wherein the scanning light source is configured in a spatial arrangement associated with a refractive/diffractive medium, and wherein the refractive/diffractive medium includes a near-eye side and a far-eye side such that when the electronic device is worn, the near-eye side is proximate an eye of the user and the far-eye side is an opposite side of the refractive/diffractive medium, receiving sensor data from a set of one or more photodiodes, the sensor data corresponding to a plurality of reflections of light produced by the scanning light source and reflected from the eye, wherein the light that is reflected by the eye passes through the refractive/diffractive medium before capture by the set of one or more photodiodes, and determining a characteristic of the eye based on the sensor data.

These and other embodiments may each optionally include one or more of the following features.

In some aspects, the scanning light source is positioned behind the far-eye side of the refractive/diffractive medium and configured to project light towards the eye through the refractive/diffractive medium.

In some aspects, the set of the one or more photodiodes are positioned proximate the far-eye side of the refractive/diffractive medium. In some aspects, the set of the one or more photodiodes are positioned proximate to the near-eye side of the refractive/diffractive medium. In some aspects, the set of the one or more photodiodes are positioned within the refractive/diffractive medium. In some aspects, the set of the one or more photodiodes are positioned between the far-eye side of the refractive/diffractive medium and a display portion of the device. In some aspects, the set of the one or more photodiodes are positioned within a display portion of the device.

In some aspects, the device further includes an adaptive polarization control unit, an adaptive sensor, and a refractive component. In some aspects, the adaptive polarization control unit is configured to receive, from the adaptive sensor, light from the scanning light source reflected from the refractive component, determine a property associated with the light, and modify and reflect the light to the eye via the adaptive sensor.

In some aspects, the device further includes a spatial light module. In some aspects, the method further includes receiving spatial light data from the spatial light module, the spatial light data corresponding to the plurality of reflections of light produced by the scanning light source and reflected from the eye that are passed through the spatial light module, determining a phase state of the sensor data from the set of one or more photodiodes, and modifying a phase of the projected light from the scanning light source based on one or more phase modification techniques.

In some aspects, determining the characteristic of the eye based on the sensor data includes determining at least one of a phase, an intensity, an angle, a timing, and a polarization of the light. In some aspects, determining the characteristic of the eye based on the sensor data includes determining a position of a pupil of the eye. In some aspects, determining the characteristic of the eye based on the sensor data includes determining a gaze direction based on a detected reflection angle. In some aspects, determining the characteristic of the eye based on the sensor data includes determining a shape of the eye.

In some aspects, the method further includes initiating an action based on detecting that the gaze direction is approximately oriented towards a target area.

In some aspects, the scanning light source is one of a plurality of scanning light sources coupled to the electronic device. In some aspects, the electronic device is a head-mounted device (HMD).

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 6 is a flowchart representation of a method for assessing an eye characteristic based on reflected light from a scanning light source received at one or more photodiodes in accordance with some implementations.

Figure 1:
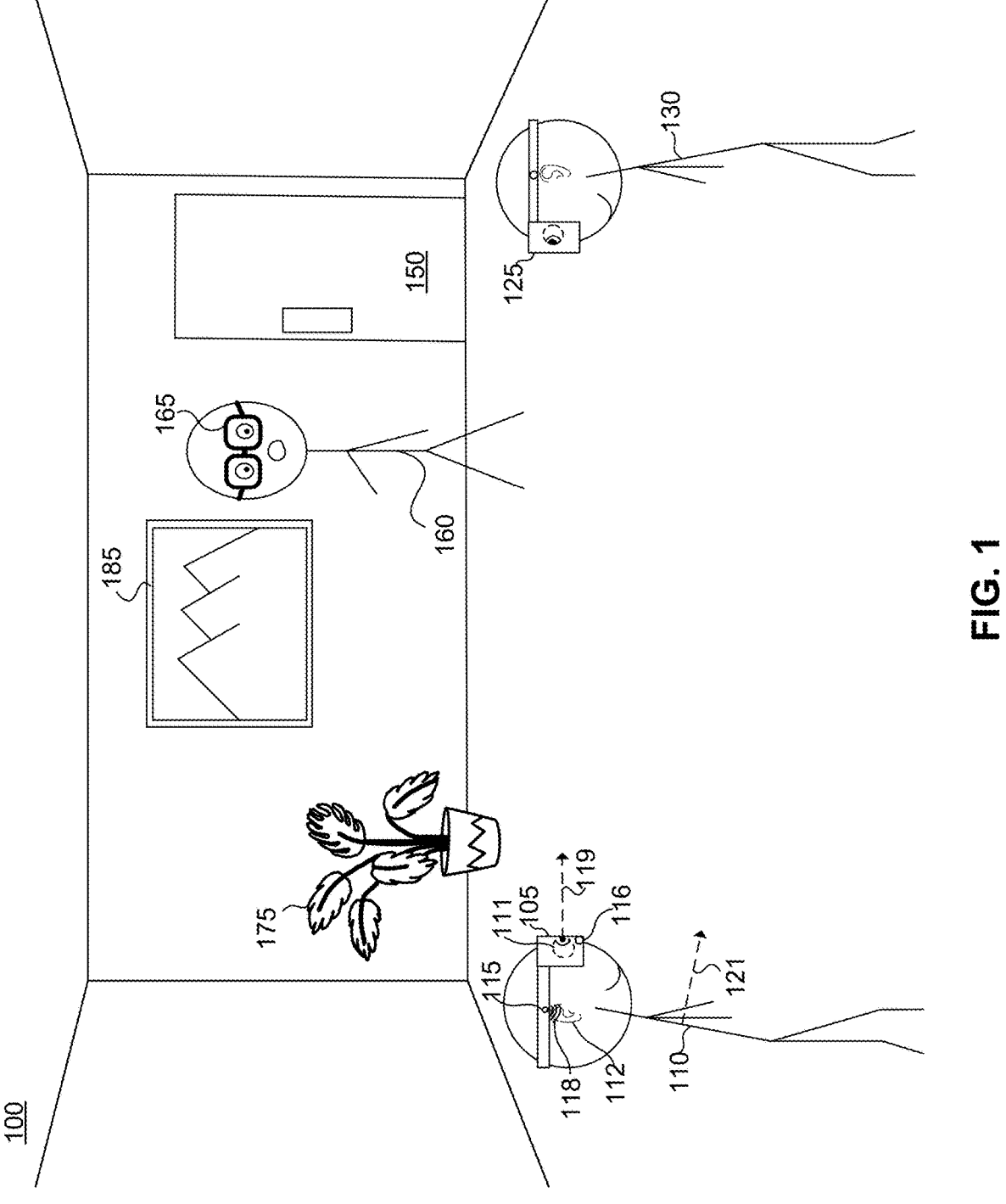
FIG. 1 illustrates an environment in which extended reality (XR) content is provided to one or more users wearing head mounted displays (HMDs) in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

FIG. 1 illustrates a real-world physical environment 100 including a first user 110 wearing a first device 105, a second user 130 wearing a second device 125, a third user 160 wearing a third device 165, a wall-hung picture 185, a plant 175, and a door 150. In some implementations, one or more of the devices 105, 125, 165 is configured to provide content based on one or more sensors on the respective devices or to share information and/or sensor data with one another. In some implementations, one or more of the devices 105, 125, 165 provide content that provides augmentations in XR using sensor data. The sensor data may be used to understand that a user's state is associated with providing user assistance, e.g., a user's appearance or behavior or an understanding of the environment may be used to recognize a need or desire for assistance.

In the example of FIG. 1, the first device 105 includes one or more sensors 116 that capture light-intensity images, depth sensor images, audio data or other information about the user 110 and the physical environment 100. For example, the one or more sensors 116 may capture images of the user's forehead, eyebrows, eyes, eye lids, cheeks, nose, lips, chin, face, head, hands, wrists, arms, shoulders, torso, legs, or other body portion. Sensor data about a user's eye 111, as one example, may be indicative of various user characteristics, e.g., the user's gaze direction 119 over time, user saccadic behavior over time, user eye dilation behavior over time, etc. The one or more sensors 116 may capture audio information including the user's speech and other user-made sounds as well as sounds within the physical environment 100.

One or more sensors, such as one or more sensors 115 on device 105, may identify user information based on proximity or contact with a portion of the user 110. As example, the one or more sensors 115 may capture sensor data that may provide biological information relating to a user's cardiovascular state (e.g., pulse), body temperature, breathing rate, etc.

The one or more sensors 116 or the one or more sensors 115 may capture data from which a user orientation 121 within the physical environment can be determined. In this example, the user orientation 121 corresponds to a direction that a torso of the user 110 is facing.

In some implementations, the content provided by the device 105 and sensor features of device 105 may be provided using components, sensors, or software modules that are sufficiently small in size and efficient with respect to power consumption and usage to fit and otherwise be used in lightweight, battery-powered, wearable products such as wireless ear buds or other ear-mounted devices or head mounted devices (HMDs) such as smart/augmented reality (AR) glasses. Features can be facilitated using a combination of multiple devices. For example, a smart phone (connected wirelessly and interoperating with wearable device(s)) may provide computational resources, connections to cloud or internet services, location services, etc.

In some implementations, data is shared amongst a group of devices to improve user state or environment understanding. For example, device 125 may share information (e.g., images, audio, or other sensor data) corresponding to user 110 or the physical environment 100 (including information about user 130 or user 160) with device 105 so that device 105 can better understand user 110 and physical environment 100.

In some implementations, devices 105, 125, 165 are head mounted devices (HMDs) that present visual or audio content (e.g., extended reality XR content) or have sensors that obtain sensor data (e.g., visual data, sound data, depth data, ambient lighting data, etc.) about the environment 100 or sensor data (e.g., visual data, sound data, depth data, physiological data, etc.) about the users 110, 130, 160. Such information may, subject to user authorizations, permissions, and preferences, be shared amongst the device 105, 125, 165 to enhance the user's experiences on such devices.

In some implementations, the devices 105, 125, 165 obtain physiological data (e.g., EEG amplitude/frequency, pupil modulation, eye gaze saccades, etc.) from the users 110, 130, 160 via one or more sensors that are proximate or in contact with the respective user 110, 130, 160. For example, the device 105 may obtain pupillary data (e.g., eye gaze characteristic data) from an inward facing eye tracking sensor. In some implementations, the devices 105, 125, 165 include additional sensors for obtaining image or other sensor data of the physical environment 100.

In some implementations, the devices 105, 125, 165 are wearable devices such as ear-mounted speaker/microphone devices (e.g., headphones, ear pods, etc.), smart watches, smart bracelets, smart rings, smart/AR glasses, or other head-mounted devices (HMDs). In some implementations, the devices 105, 125, 165 are handheld electronic devices (e.g., smartphones or tablets). In some implementations, the devices 105, 125, 165 are laptop computers or desktop computers. In some implementations, the devices 105, 125, 165 have input devices such as audio command input systems, gesture recognition-based input systems, touchpads or touch-sensitive displays (also known as a "touch screen" or "touch screen display"). In some implementations, multiple devices are used together to provide various features.

For example, a smart phone (connected wirelessly and interoperating with wearable device(s)) may provide computational resources, connections to cloud or internet services, location services, etc.

FIG. 1 illustrates an example in which the devices within the physical environment 100 include HMD devices 105, 125, 165. Numerous other types of devices may be used including mobile devices, tablet devices, wearable devices, hand-held devices, personal assistant devices, AI-assistant-based devices, smart speakers, desktop computing devices, menu devices, cash register devices, vending machine devices, juke box devices, or numerous other devices capable of presenting content, capturing sensor data, or communicating with other devices within a system, e.g., via wireless communication. For example, assistance may be provided to a vision impaired person to help the person understand a menu by providing data from the menu to a device being worn by the vision impaired person, e.g., enabling that device to enhance the user's understanding of the menu by providing visual annotations, audible cues, etc.

In some implementations, the devices 105, 125, 165 include eye tracking systems for detecting eye position and eye movements. For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user. Moreover, an illumination source on a device may emit NIR light to illuminate the eyes of the user and the NIR camera may capture images of the eyes of the user. In some implementations, images captured by the eye tracking system may be analyzed to detect position and movements of the eyes of the user, or to detect other information about the eyes such as pupil dilation or pupil diameter. Moreover, the point of gaze estimated from the eye tracking images may enable gaze-based interaction with content shown the device. Additional cameras may be included to capture other areas of the user (e.g., an HMD with a jaw cam to view the user's mouth, a down cam to view the body, an eye cam for tissue around the eye, and the like). These cameras and other sensors can detect motion of the body, or signals of the face modulated by the breathing of the user (e.g., remote PPG).

In some implementations, the devices 105, 125, 165 have graphical user interfaces (GUIs), one or more processors, memory and one or more modules, programs or sets of instructions stored in the memory for performing multiple functions. In some implementations, the users 110, 130, 160 may interact with a GUI through voice commands, finger contacts on a touch-sensitive surface, hand/body gestures, remote control devices, or other user input mechanisms. In some implementations, the functions include viewing/listening to content, image editing, drawing, presenting, word processing, website creating, disk authoring, spreadsheet making, game playing, telephoning, video conferencing, e-mailing, instant messaging, workout support, digital photographing, digital videoing, web browsing, digital music playing, or digital video playing. Executable instructions for performing these functions may be included in a computer readable storage medium or other computer program product configured for execution by one or more processors.

In some implementations, the devices 105, 125, 165 employ various physiological or behavioral sensor, detection, or measurement systems. Detected physiological data may include, but is not limited to, EEG, electrocardiography (ECG), electromyography (EMG), functional near infrared spectroscopy signal (fNIRS), blood pressure, skin conductance, or pupillary response. Detected behavioral data may include, but is not limited to, facial gestures, facial expressions, body gestures, or body language based on image data, voice recognition based on acquired audio signals, etc.

In some implementations, the devices 105, 125, 165 (or other devices) may be communicatively coupled to one or more additional sensors. For example, a sensor (e.g., an EDA sensor) may be communicatively coupled to a device 105, 125, 165 via a wired or wireless connection, and such a sensor may be located on the skin of a user (e.g., on the arm, placed on the hand/fingers of the user, etc.). For example, such a sensor can be utilized for detecting EDA (e.g., skin conductance), heart rate, or other physiological data that utilizes contact with the skin of a user. Moreover, a device 105, 125, 165 (using one or more sensors) may concurrently detect multiple forms of physiological data in order to benefit from synchronous acquisition of physiological data or behavioral data. Moreover, in some implementations, the physiological data or behavioral data represents involuntary data, e.g., responses that are not under conscious control. For example, a pupillary response may represent an involuntary movement. In some implementations, a sensor is placed on the skin as part of a watch device, such as a smart watch.

In some implementations, one or both eyes of a user, including one or both pupils of the user present physiological data in the form of a pupillary response (e.g., eye gaze characteristic data). The pupillary response of the user may result in a varying of the size or diameter of the pupil, via the optic and oculomotor cranial nerve. For example, the pupillary response may include a constriction response (miosis), e.g., a narrowing of the pupil, or a dilation response (mydriasis), e.g., a widening of the pupil. In some implementations, a device may detect patterns of physiological data representing a time-varying pupil diameter. In some implementations, the device may further determine the interpupillary distance (IPD) between a right eye and a left eye of the user.

The user data (e.g., upper facial feature characteristic data, lower facial feature characteristic data, and eye gaze characteristic data, etc.), including information about the position, location, motion, pose, etc., of the head or body of the user, may vary in time and a device 105, 125, 165 (or other devices) may use the user's data to track a user state. In some implementations, the user data includes texture data of the facial features such as eyebrow movement, chin movement, nose movement, cheek movement, etc. For example, when a person (e.g., user 110, 130, 160) performs a facial expression or micro expression associated with lack of familiarity or confusion, the upper and lower facial features can include a plethora of muscle movements that are used to assess the state of the user based on the captured data from sensors.

The physiological data (e.g., eye data, head/body data, etc.) and behavioral data (e.g., voice, facial recognition, etc.) may vary in time and the device may use the physiological data or behavioral data to measure a physiological/behavioral response or the user's attention to object or intention to perform an action. Such information may be used to identify a state of the user with respect to whether the user needs or desires assistance.

Information about such assistance predictions and how a user's own data is used may be provided to a user and the user given the option to opt out of automatic predictions/use of their own data and given the option to manually override assistance features. In some implementations, the system is configured to ensure that users' privacy is protected by requiring permissions to be granted before user state is assessed or assistance is enabled.

Figure 2:
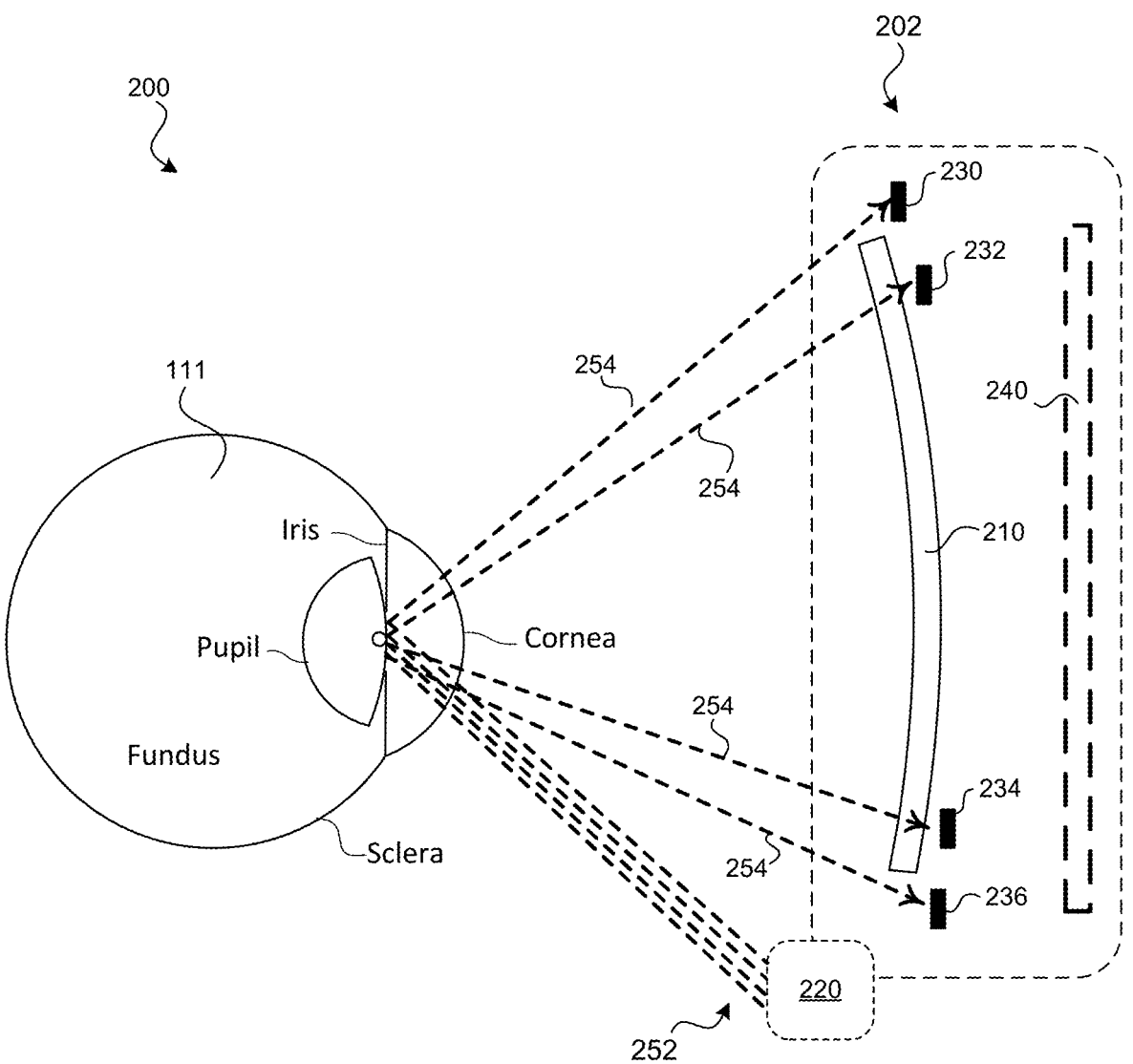
FIG. 2 illustrates an example eye-tracking system using a scanning light source and a set of photodiodes in accordance with some implementations.

FIG. 2 illustrates an example environment 200 of an example eye-tracking system using a scanning light source and a set of photodiodes in accordance with some implementations. In particular, the eye-tracking system of example environment 200 illustrates tracking an eye characteristic of eye 111 via a light source 220 (e.g., a light projection component such as a MEMS laser scanner) of a device 202 (e.g., an HMD, such as device 105 of FIG. 1). The device 202 further includes a lens 210, a display portion 240, and photodiodes 230, 232, 234, 236. As illustrated in FIG. 2, the photodiodes 230, 232, 234, and 236 are positioned in an area behind the lens 210 and in front of the display 240. However, in some implementations, the photodiodes 230, 232, 234, and 236 may each be positioned in alternative spatial arrangements. For example, one or more of the photodiodes 230, 232, 234, 236 may be positioned in front of the lens 210, embedded within the lens 210, around the edge of the lens 210 (e.g., on an edge of a frame), embedded within or around a display portion 240 of the device, or a combination thereof. In some implementations, the photodiodes may be transparent multispectral photodetectors that are imperceptible to the human eye.

The eye-tracking system of example environment 200 illustrates a single light system to observe glints that the eye 111 is reflecting into one or more photo detectors (e.g., photodiodes 230, 232, 234, 236, etc.). For example, as illustrated in FIG. 2, the light source 220 produces light that is flashed at an eye 111. The light waves are then reflected off of the cornea of the eye 111 and detected by the detectors (e.g., photodiodes 230, 232, 234, 236) which detect the glints such as the reflected light rays (e.g., reflected light rays 254 from the light rays 252). In one aspect, the light source 220 is used both for illuminating specular and diffusive parts of an object (e.g., eye 111) and thus may provide at least a threshold level of illumination. Providing at least such a threshold level of illumination may result in glints that would be detected in images captured by the detectors (e.g., photodiodes 230, 232, 234, 236). For example, light rays 252 from light source 220, would produce the specular glint light rays 254.

In some implementations, multiple light sources, such as MEMS laser scanners (e.g., light source 220) may be used. For example, an implementation of multiple light sources may increase a field of view may provide a stereoscopic view to aid in a creation of a 3D model of the eye.

Figure 3B:
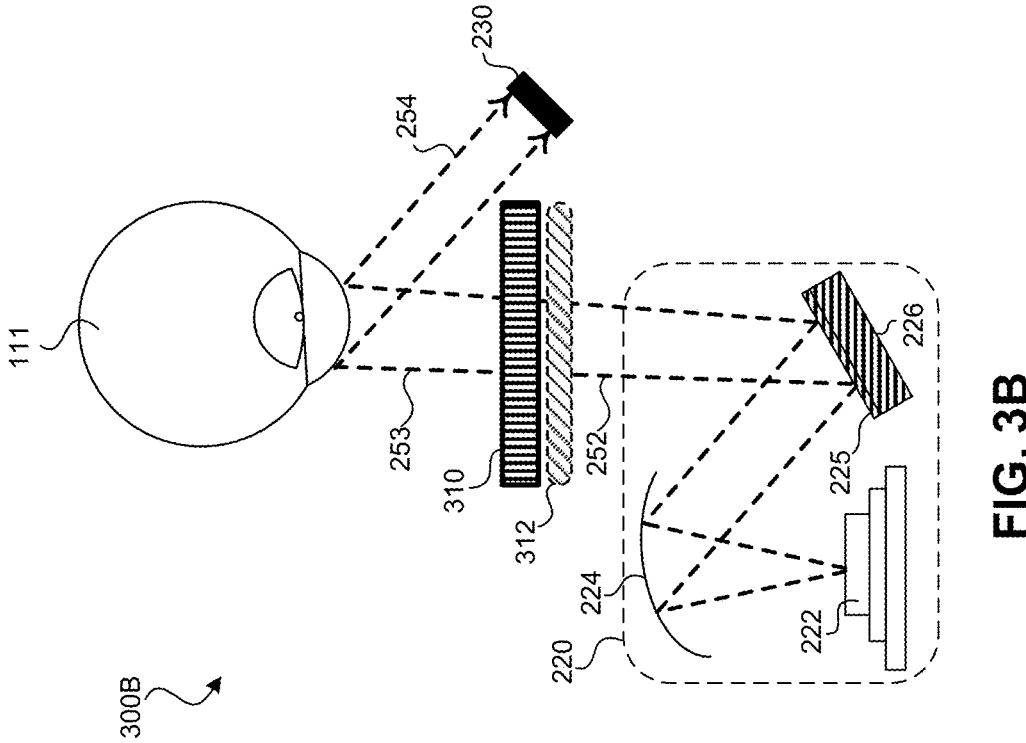
FIGS. 3A and 3B illustrate different embodiments of the eye-tracking system of FIG. 2 in accordance with some implementations.
Figure 3A:
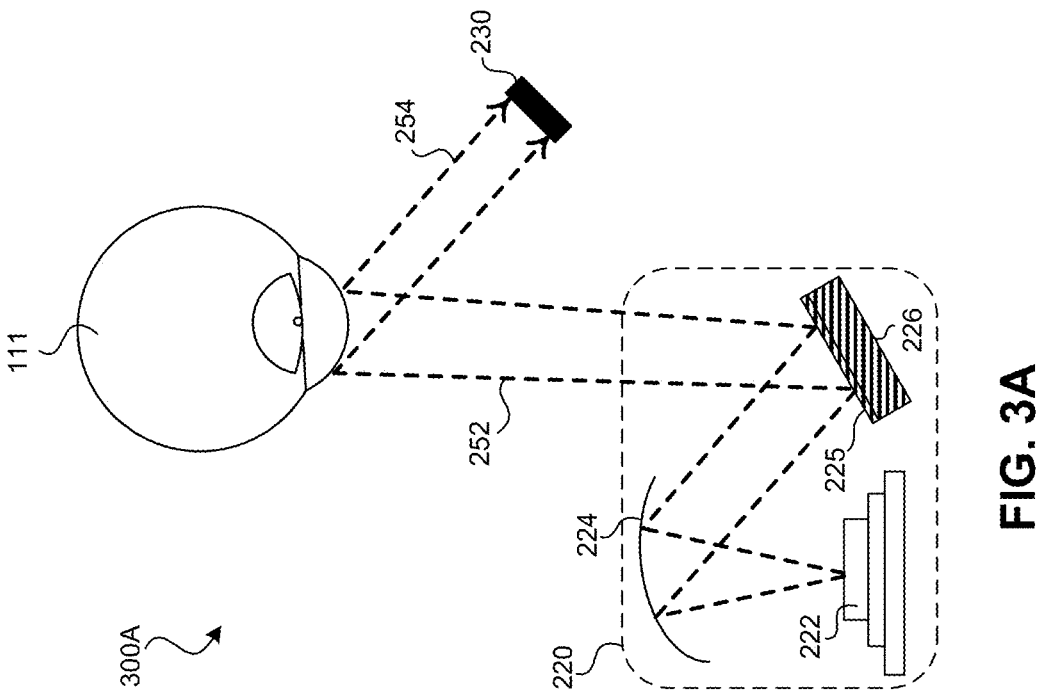

FIG. 3A and FIG. 3B illustrate different embodiments of the eye-tracking system of FIG. 2 in accordance with some implementations. In particular, FIG. 3A illustrates an example environment 300A of a light source 220 projecting light rays 252 to produce the specular glint light rays 254 from the eye 111 and detected by the photodiode 230. In particular, FIG. 3A (and FIG. 3B) illustrates exemplary components of a MEMS laser scanner system as the light source 220. For example, the light source 220 as a MEMS laser scanner system includes a scanning light projection component 222, a refractive component 224 (e.g., a mirror), an adaptive sensor 225, and an adaptive polarization control unit 226. In an exemplary implementation, the adaptive polarization control unit 226 is configured to receive, from the adaptive sensor 225, light from the scanning light projection component 222 reflected from the refractive component 224 (e.g., mirror), determine a property associated with the light, and modify and reflect the light to the eye 111 via the adaptive sensor 225.

In some implementations, the adaptive polarization control unit 226 may be utilized to counterpart for the polarization states of the refractive/diffractive medium to allow a maximum number of rays to pass through the refractive/diffractive medium and reflect off the eye and return back to the one or more photodiodes. In some implementations, the adaptive polarization control unit 226 may be utilized to adjust and reorient reflected light to different directions so that polarization layers may adapt to different incident angles, and thus different lens designs and/or different refractive materials may be used based on adjusting the adaptive sensor 225 via the adaptive polarization control unit 226. Thus, the adaptive polarization control unit 226 may improve signal to noise ratio and as a result improve accuracy of the eye tracking system.

In some implementations, the adaptive polarization control unit 226 may be configured to minimize an amount of internal reflection and noise produced from the reflected light from the scanning light projection component 222 and the refractive component 224. For example, polarization states of the scanning light projection component 222 (e.g., a MEMS scanner) may be selected based on the refractive/diffractive medium polarization and optical states. In some systems, a signal received on the photodiodes may be degraded due to multiple reflections of the light with the refractive elements and may include an immense amount of noise interference, which can hamper accurate eye tracking; however, the adaptive polarization control unit 226 can improve the signal-to-noise issues based on adapting to the determined different polarization states.

FIG. 3B illustrates an example environment 300B similar to environment 300A of FIG. 3A including the exemplary components of a scanning MEMS laser scanner for the light source 220, but further including additional components for additional measurements. For example, FIG. 3B illustrates additional components for depth measurements, i.e., a spatial light modular system that includes a spatial light modulator unit 310 and a partial mirror 312 that are positioned between the light source 220 and the eye 111, such that the light rays 252 pass through the spatial light modular system to valiantly phase modulate the incoming light (e.g., light rays 252) to produce modulated light rays 253. As further discussed herein with reference to FIG. 4, the spatial light modulator unit 310 may be configured to modulate an amplitude, phase, and/or polarization of each incoming light beam 252 at a given time and with a given angle. In some implementations, based on a calibration of the system, some light modulation techniques are able to determine and use a phase shifting algorithm and/or use two laser scanners with two known frequencies to resolve phase ambiguities of a light beam received on a photo detector (e.g., photodiode 230). As the result, the phase information may be extracted and consequently 3D depth information of the eye 111 or a face of the user may be determined for applications such as a proximity sensor and/or 3D face identification recognition. For example, resolving phase ambiguity or utilizing phase shift techniques may be implemented based on observing a cornea location and determining how the cornea may be changing, which may depend on movement of the cornea. Thus, based on the determined changes of the cornea location, the adaptive polarization control unit 226 may modify a wavelength of the produced light rays 252 by adapting the adaptive sensor 225.

Figure 4:
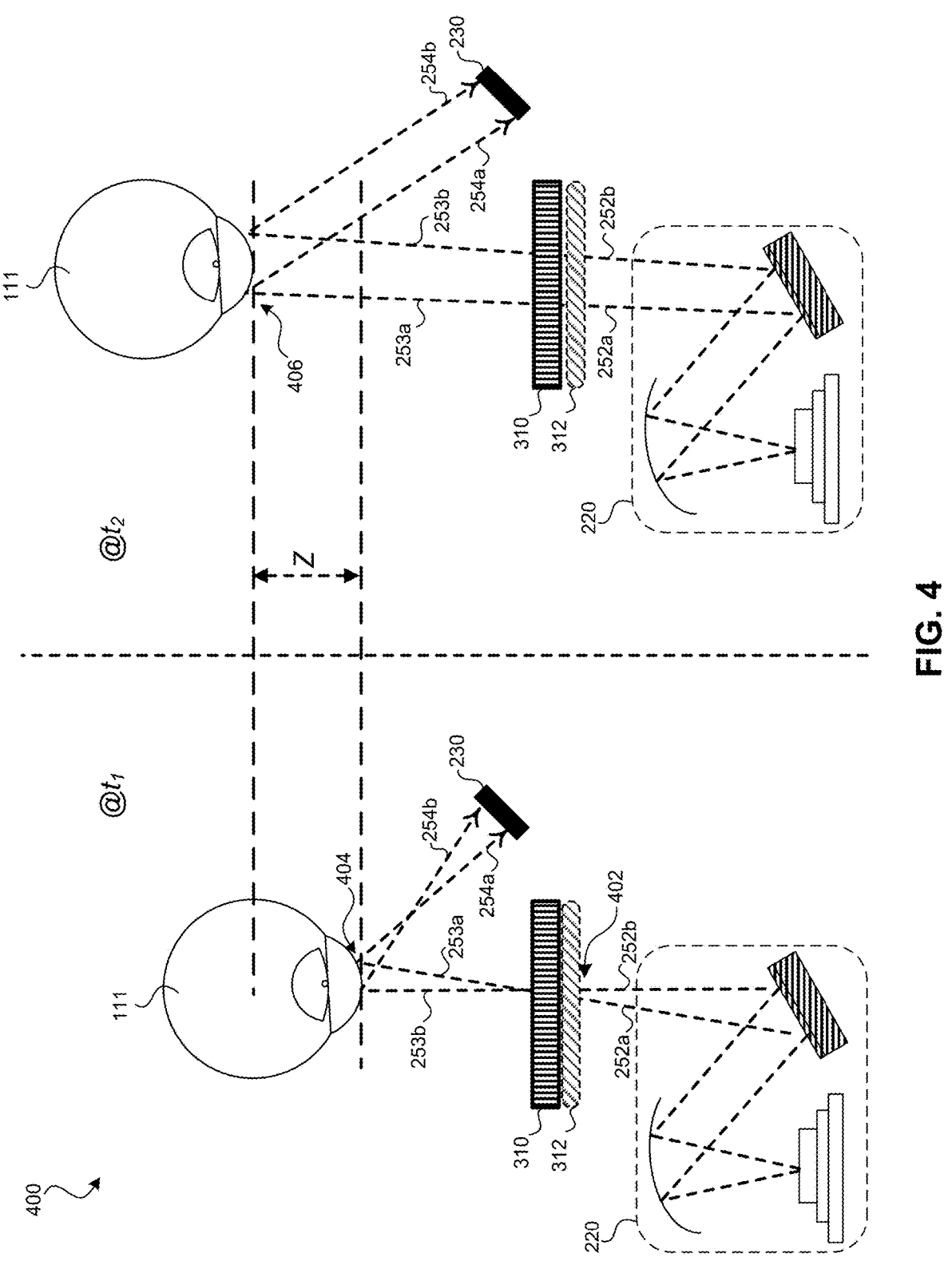
FIG. 4 illustrates an example of utilizing the eye-tracking system of FIG. 3B for adaptive measurement techniques in accordance with some implementations.

FIG. 4 illustrates an example operating environment 400 of utilizing the eye-tracking system of FIG. 3B for adaptive measurement techniques in accordance with some implementations. In particular, the spatial light modulator unit 310 in conjunction with the partial mirror 312 may be configured to modulate an amplitude, phase, and/or polarization of light waves 252 from light source 220 in space and time from a first time ($@t_1$) to a second point in time ($@t_2$). For example, at a first time ($@t_1$), the spatial light modulator unit 310 receives incoming light rays 252a, 252b, which are then reflected to the eye 111 as modulated light rays 253a, 253b, respectively, and reflected off of the eye 111 to the photodiode 230 as reflected light rays 254a, 254b, respectively. Then, at a second point in time ($@t_2$), the spatial light modulator unit 310 determines to modulate the incoming light rays 252a, 252b, which are then reflected to the eye 111 as modulated light rays 253a, 253b, respectively, and then reflected off of the eye 111 to the photodiode 230 as reflected light rays 254a, 254b, respectively. As the result, the phase information may be extracted and consequently 3D depth information Z of the eye 111 (or a face) of the user may be determined and used for applications such as a proximity sensor and/or 3D face identification recognition.

In some implementations, the spatial light modulator unit 310 determines the intensity of the light for a given time in order to determine a depth measurement system (e.g., calculating Z depth) for usage in refractive or a refractive medium environment. For example, the light intensity at point 402 for the first light ray 252a (e.g., a red light) at the spatial light modulator unit 310 may be determined by spatial light modulator unit 310 based on the light intensity and frequency the first light ray 252a and the position coordinates of the light at the point 402. Similarly, the light intensity, frequency, and position coordinates at point 404 at a first point in time ($@t_1$) and the light intensity, frequency, and position coordinates at point 406 at a second point in time ($@t_2$) for the first reflected light ray 254a from the eye 111 of the first modulated light ray 253a may be determined. Thus, based on the determined position coordinates of the light at the point 404 at a first point in time ($@t_1$) and the position coordinates of the light at the point 406 at a second point in time ($@t_2$), a depth measurement Z may be determined. In some implementations, applications such as a proximity sensor, three-dimensional (3D) face identification recognition, and the like, may be determined based on the Z depth measurement.

Figures 5A, 5B, 5C, 5D:
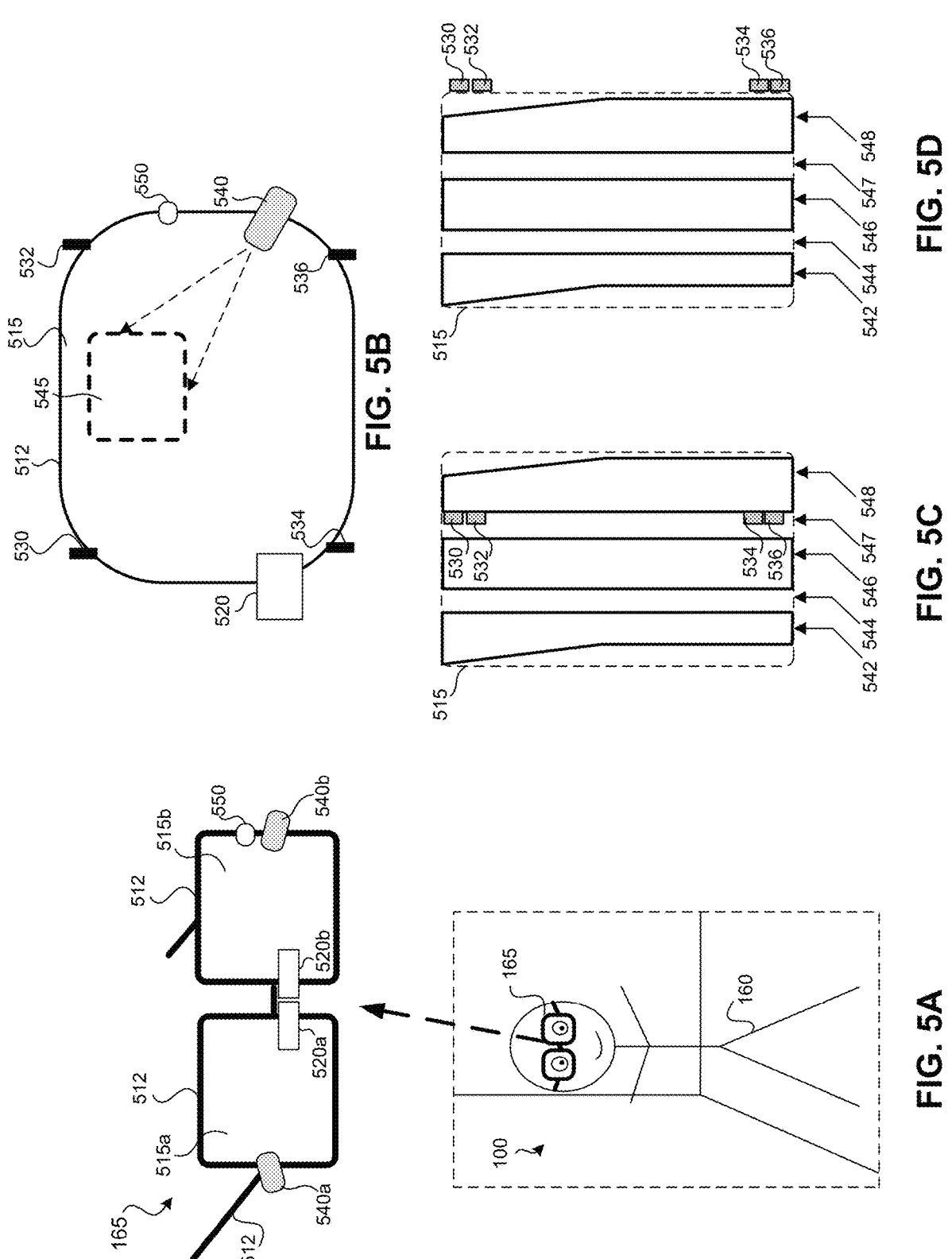
FIG. 5A illustrates an example of a user wearing an HMD in accordance with some implementations.
FIG. 5B illustrates an example view of a refractive/diffractive medium of the HMD of FIG. 5A in accordance with some implementations.
FIGS. 5C and 5D illustrate different spatial arrangements of photodiodes with respect to the refractive/diffractive medium of the HMD of FIG. 5A in accordance with some implementations.

FIG. 5A illustrates an example of a user wearing an HMD in accordance with some implementations. In particular, FIG. 5A illustrates an example operating environment of the real-world environment 100 (e.g., a room) from FIG. 1, including the user 160 wearing device 165 (e.g., an HMD). In this example, the device 165 is an HMD that includes a transparent or a translucent display that includes a medium through which light representative of images is directed to the eyes of user 160. In particular, device 165 is an HMD that may also be referred to herein as "AR glasses" or "XR glasses." Such XR glasses may include a transparent display to view the physical environment and be provided a display to view other content via retinal projection technology that projects graphical images within a view of a person's retina or onto a person's retina.

As illustrated, device 165 includes a frame 512 that can be worn on the user's head and may include additional extensions (e.g., arms) that are placed over ears of the user 160 to hold the frame in place on the user's head. The device 165 includes two displays for a left eye and a right eye of the user 160. The frame 512 supports a first lens 515a, and a second lens 515b. Each lens 515 includes a refractive/diffractive medium. Each lens 515 may be configured as a stack that includes a bias (+/−) for prescription lenses, a waveguide for housing or embedding a plurality of IR light sources and transparent conductors, and the like.

The device 165 further includes a light source 520a and light source 520b, for each lens 515a, 515b, respectively. A light source 520 may be a light projection component, such as a MEMS laser scanner, that projects light rays to an eye of the user in order to produce a reflection, such as a glint, that can be detected by one or more photodiodes 530, 532, 534, 536.

In some implementations, the device 165 further includes projector 540a, 540b, for each lens 515a, 515b, respectively. A projector 540 may be used to display XR content to the user (e.g., virtual content that appears to the user at some focal point distance away from the device 165 based on the configuration of the lens). A waveguide stacked within the lens 515 may be configured to bend and/or combine light that is directed toward the eye of the user 160 to provide the appearance of virtual content within the real physical environment 100, as further illustrated herein with reference to FIGS. 5C, 5D. In some implementations, the device 165 may only include one projector 540. For example, a pair of XR glasses for a user that only displays XR content on one side of the device 165 so the user 160 is less distracted and can have a greater view of the physical environment 100.

In some implementations, the device 165 further includes a controller 550. For example, the controller 550 may include a processor and a power source that controls the light being emitted from the light source 520. In some implementations, the controller 550 may be a microcontroller that can control the processes described herein for assessing charac- teristics of the eye (e.g., gaze direction, eye orientation, identifying an iris of the eye) based on the sensor data obtained from the photodiodes. Alternatively, the controller 550 may be communicatively coupled (e.g., wireless com- munication) with another device, such as a mobile phone, tablet, and the like, and the controller may send data collected from the photodiodes to be analyzed by the other device. In the exemplary implementation, the device 165 (with the controller 550) is a stand-alone unit that can project the virtual content via projector 540 and assess characteris- tics of the eye via light sources for eye tracking purposes without communicating with another device. In some imple- mentations, the scanning light source 520 and the plurality of photodiodes are individually addressable. For example, a processor within the controller 550 can manage the scanning light source 520 and assess each photodiode 530, 532, 534, 536, etc. individually. A pattern of reflections can be created based on the spatial arrangement of the photodiodes, and the controller 550 can control the scanning light source 520 and asses the sensor data from each photodiode.

FIG. 5B illustrates an example view of a refractive/ diffractive medium (e.g., lens 515) of the HMD 165 of FIG. 5A in accordance with some implementations. In particular, FIG. 5B illustrates a refractive/diffractive medium with components (some transparent/translucent) for an eye track- ing system and XR display for the device 165. In this example, the lens 515 includes a scanning light source 520, a plurality of photodiodes 530, 532, 534, 536, and a con- troller 550. The controller 550 may control and provide power to each component via transparent conductors. The transparent conductors may be configured to have a size that is small enough and/or are made of one or more transparent materials (e.g., transparent conducting films (TCFs)) so as to not be detectable by a human eye, and thus would be considered transparent and/or translucent when viewing content through the lens 515. Transparent conductors (e.g., connections between each component) may include an optically transparent and electrically conductive material includ- ing, but not limited to, indium tin oxide (ITO), wider- spectrum transparent conductive oxides (TCOs), conductive polymers, metal grids and random metallic networks, carbon nanotubes (CNT), graphene, nanowire meshes, and/or ultra thin films. In some implementations, transparent conductors may include semi-transparent conductor materials such as silver nano traces or the like. For example, semi-transparent material may refer to a material that is not necessarily transparent but thin enough that the material is not percep- tible to a human eye.

In some implementations, the plurality of photodiodes 530, 532, 534, 536 are located on or within the frame 512. In some implementations, the plurality of photodiodes 530, 532, 534, 536 are positioned in front of the frame 512, behind the frame 512, embedded within the lens 515, or a combination of in front of, behind, within the frame 512, and/or embedded within the lens 515. In some implemen- tations, the plurality of photodiodes 530, 532, 534, 536 are a size that is small enough that is not detectable by a human eye, thus would be considered transparent and/or translucent when viewing content through the lens 515, such as pass- through content of the physical environment 100, or XR content via display 545. For example, the photodiodes may be 200 μm, 100 μm, 75 μm, 50 μm, 25 μm, 10 μm, 5 μm, 1 μm, and/or another size that is not detectable by a human eye in ordinary use conditions.

The XR display system of the device 165 through lens 515 includes a projector 540 and a display 545 that may appear to the user as illustrated at the location of display 545. However, the light projected from the projector 540, as powered and controlled by the controller 550, is not directly projected as illustrated. Instead, the light from projector 540 may be bent, via a waveguide, such that the XR content being displayed at display 545 appears to the user 160 at some focal point distance away from the device 165 based on the configuration of the waveguide.

In some implementations, the device 165 may only have one of the lens' 515 display XR content (e.g., the left eye lens 515b would be a normal lens without a light source 520b, without photodiodes 530, etc., without a projector 540, and thus without a display 545). For example, a left eye view would only present pass-through content of the physi- cal environment 100 (e.g., such as a normal pair of glasses), and the right eye view would have both pass through content of the physical environment 100, and have the capability to present XR content to the right lens 515a only. For example, only the right lens 515a would include a light source 520, photodiodes 530, 532, 534, 536, a projector 540, and a display 545 to present XR content.

FIG. 5C and FIG. 5D illustrate different spatial arrange- ments of photodiodes with respect to the refractive/diffrac- tive medium of the HMD of FIG. 5A in accordance with some implementations. FIGS. 5C and 5D illustrate a lens 515 in an exemplary stacked configuration. Lens 515 illus- trates an example lens used with within device 165 (e.g., an HMD). Lens 515, a refractive/diffractive medium, is stacked from a user's side (e.g., the side that faces an eye of a user), with layers in order from the user's side to a world side: Bias (−) 542, air gap 544, waveguide 546, air gap 547, and Bias (+) 548. Each bias 542, 548 (also referred to herein as a "bias layer") may be used for prescription glasses, e.g., changing a level of prescription based on the size and shape of each bias. In some implementations, a prescription level is changed by only modifying one bias layer, e.g., Bias (+) 548.

FIG. 5C illustrates photodiodes 530, 532, 534, 536 embedded within the lens 515 (e.g., within the air gap 547 between the waveguide 546 and the bias (+) 548). FIG. 5D illustrates photodiodes 530, 532, 534, 536 positioned behind the lens 515. For example, the photodiodes may be coupled directly to the back of the lens 515, or may be coupled to another component behind the lens 515, such as a frame 512. Other HMDs (e.g., headsets that cover a portion of a face around the eyes of a user) may include other components behind the lens to couple the photodiodes to, as discussed herein.

FIG. 6 is a flowchart illustrating an exemplary method 600. In some implementations, a device (e.g., device 105 of FIG. 1 or device 165 of FIG. 2) performs the techniques of method 600 to assess an eye characteristic of a user based on reflected light from a plurality of light sources on a refractive/diffractive medium. In some implementations, the techniques of method 600 are performed on a mobile device, desktop, laptop, HMD, or server device. In some implementations, the method 600 is performed on processing logic, including hardware, firmware, software, or a combination thereof. In some implementations, the method 600 is performed on a processor executing code stored in a non-transitory computer-readable medium (e.g., a memory). In some implementations, the method 600 is performed in combination of one or more devices as described herein. For example, sensor data from a plurality of light sensors may be acquired at an HMD (e.g., device 165), but the processing of the data (e.g., assess an eye characteristic) may be performed at a separate device (e.g., a mobile device, such as device 105).

At block 602, the method 600 produces light from a scanning light source capable of projecting light in a plurality of different directions over time toward an eye. In some implementations, the refractive/diffractive medium (e.g., lens) includes a near-eye side and a far-eye side such that when the electronic device is worn, the near-eye side is proximate an eye of the user and the far-eye side is an opposite side of the refractive/diffractive medium. In some implementations, the scanning light source is configured in a spatial arrangement associated with a refractive/diffractive medium. In some implementations, the scanning light source is positioned behind the far-eye side of the refractive/diffractive medium and configured to project light towards the eye through the refractive/diffractive medium. For example, the light source (e.g., a MEMS scanner) may be positioned outside of the refractive/diffractive medium (e.g., on a frame of a device), in an area behind the refractive/diffractive medium and/or in front of a display portion of the device, embedded within the refractive/diffractive medium, or positioned at another location on the device but within a line of sight of the reflections from the projected light from the scanning light source.

The scanning light source produces glints (e.g., a specular reflection) by producing light that reflects off a portion of an eye. In some implementations, a glint may be a specular glint. In some implementations, if a scanning light source is used both for illuminating specular and diffusive parts of the object (e.g., eye 111 of the user 110), the specular "glints" must be in saturation in order to detect the diffusive area of the object. For example, as illustrated in FIG. 2, a light source 220 (e.g., a projection component such as a MEMS laser scanner, and the like) is flashed at an eye 111, and the detectors (e.g., photodiodes 230, 232, 234, 236) detect the glints such as the reflected light rays (e.g., reflected light rays 254 from the light rays 252) from the eye 111.

In some implementations, the scanning light source is one of a plurality of scanning light sources coupled to the electronic device. For example, multiple laser scanners may be used to increase a field of view (FOV) and could provide a stereoscopic view to allow the creation of 3D eye model for efficient.

At block 604, the method 600 receives sensor data from a set of one or more photodiodes, the sensor data corresponding to a plurality of reflections of light produced by the scanning light source and reflected from the eye. For example, the photodiodes (e.g., photodiodes 230, 232, 234, 236) may be a sensor/detector that receives the reflections of light off of the eye (e.g., glints), such as reflected light rays 254 from the light rays 252, as illustrated in FIG. 2. In some implementations, the photodiodes may be positioned in an area in front of the lens, outside of the lens (e.g., on a frame of a device), in an area behind the lens, or embedded within the lens.

In some implementations, the set of the one or more photodiodes are positioned proximate the far-eye side of the refractive/diffractive medium. (e.g., on the display side of a lens that is positioned between an eye and a display). In some implementations, the set of the one or more photodiodes are positioned proximate to the near-eye side of the refractive/diffractive medium. (e.g., on the near side of a lens that is positioned between an eye and the lens). In some implementations, the set of the one or more photodiodes are positioned between the far-eye side of the refractive/diffractive medium and a display portion of the device. For example, as illustrated in FIG. 2, the photodiodes 230, 232, 234, and 236 are positioned in an area behind the lens 210 and in front of the display 240. In some implementations, the set of the one or more photodiodes are positioned within a display portion of the device. In some implementations, the set of the one or more photodiodes are positioned within the refractive/diffractive medium. For example, the photodiodes may be transparent multispectral photodetectors that are imperceptible to the human eye and directly placed onto the refractive/diffractive medium or onto a display of the device.

In some implementations, the method 600 determines a location of a glint based on the reflected light received at the sensor. For example, determining a location of the glint may include determining a centroid of the received light. In some implementations, multiple glints may be produced and located by a sensor (e.g., photodiodes 230, 232, etc.). For example, a centroid can be determined based on a non-saturated periphery (e.g., a halo).

At block 606, the method 600 determines a characteristic of the eye based on the sensor data. For example, based on the sensor data obtained from the set of photodiodes, the eye tracking system described herein may be able to identify and/or track a position and/or orientation of an eye, a gaze direction, the cornea shape, and the like.

In some implementations, the device may further include an adaptive polarization control unit, an adaptive sensor (MEMS scanner/mirror), and a refractive component (e.g., a mirror). The adaptive polarization control unit may be "adaptive" for different lens designs and/or for different refractive materials. In some implementations, the adaptive polarization control unit may be configured to receive, from the adaptive sensor (e.g., adaptive sensor 225), light from the scanning light source reflected from the refractive component, determine a property associated with the light, and modify and reflect the light to the eye via the adaptive sensor 225. For example, as illustrated in FIGS. 3A, 3B, the MEMS scanner (e.g., adaptive polarization control unit 226) may reorient the reflected light from the refractive component 224 (e.g., a MEMS mirror) from the MEMS light source 222 to different directions upon the eye 111 such that polarization layers of the MEMS scanner (e.g., adaptive polarization control unit 226 via the adaptive sensor 225) may adapt to different incident angles in order to make the eye tracking system work for the range of different angles that may be required.

In some implementations, the device may further include a spatial light module that is positioned between the scanning light source and the eye. For example, as illustrated in FIG. 3B, a spatial light module 310 and a spatial partial mirror 312 are positioned in front of the MEMS scanner (e.g., adaptive polarization control unit 226) to valiantly phase modulate the incoming light with different angles in order extract the phase information and/or 3D depth information of the eye or face. In some implementations, the phase information and/or 3D depth information of the eye or face may be used for applications such as a proximity sensor or 3D face identification recognition.

In some implementations, the processor is further configured to perform operations including receiving spatial light data from the spatial light module, the spatial light data corresponding to the plurality of reflections of light produced by the scanning light source and reflected from the eye that are passed through the spatial light module, determining a phase state of the sensor data from the set of one or more photodiodes, and modifying a phase of the projected light from the scanning light source based on one or more phase modification techniques. For example, as illustrated in FIG. 4, phase ambiguity or phase shifting techniques may be resolved by determining the cornea location of the eye 111 and determining if and how the cornea may be changing and/or moving. Thus, depending on the movement of the cornea, the eye tracking system may be able to switch a wavelength of the projected light to the eye 111 (e.g., frame projection techniques (i.e., $\pi/2$, $\pi/3$, $\pi/4$, etc.), or other phase shifting techniques to resolve phase ambiguity).

In some implementations, determining the characteristic of the eye based on the sensor data includes determining at least one of a phase, an intensity, an angle, a timing, and a polarization of the light. In some implementations, determining the characteristic of the eye based on the sensor data includes determining a position of a pupil of the eye. For example, an XYZ coordinate in a 3D space may be determined for the pupil position based on the sensor data of the set of photodiodes. In some implementations, determining the characteristic of the eye based on the sensor data includes determining a gaze direction based on a detected reflection angle. In some implementations, determining the characteristic of the eye based on the sensor data includes determining a shape of the eye. For example, the eye tracking system described herein can determine pupil position (e.g., X,Y,Z coordinates) as well as gaze and other features such as eyelid, eyebrows, etc., and their associated movements.

In some implementations, determining an eye characteristic may be based on a determined location of the glint. For example, the eye characteristic may include a gaze direction, eye orientation, identifying an iris of the eye, or the like, for an eye-tracking system. For example, if the electronic device is an HMD, the eye-tracking system for the HMD can track gaze direction, eye orientation, identification of the iris, etc., of a user.

In some implementations, determining an orientation of the eye is based on identifying a pattern of the glints/light reflections in an image. In one example, gaze direction may be determined using the sensor data to identify two points on the eye, e.g., a cornea center and an eyeball center. In another example, gaze direction may be determined using the sensor data (e.g., a pattern of glints) to directly predict the gaze direction. For example, a machine learning model may be trained to directly predict the gaze direction based on the sensor data.

In some implementations, the processor may be further configured to initiate an action based on detecting that the gaze direction is approximately oriented towards a target area.

In some implementations, for iris identification, the user may be uniquely identified from a registration process or prior iris evaluation. For example, the method 600 may include assessing the characteristic from the eye by performing an authentication process. The authentication process may include identifying an iris of an eye. For example, matching a pattern of glints/light reflections in an image with a unique pattern associated with the user. In some embodiments, the iris identification techniques (e.g., matching patterns), may be used for anti-spoofing. For example, there could be multiple enrolled patterns that may be changed and can be used to authenticate a user's iris against a pre-enrolled biometric template, and confirm that the user is the right person, a real person, and is authenticating in real-time. Iris identification may be used as a primary authentication mode or as part of a multi-factor or step-up authentication. The matching patterns may be stored in a database located on the HMD (e.g., device 105), another device communicatively coupled to the HMD (e.g., a mobile device in electronic communication with the HMD), an external device or server (e.g., connected through a network), or a combination of these or other devices.

In some implementations, the device executing the techniques of method 600 (e.g., device 165) includes a frame, a scanning light source (e.g., a light projection component, such as a MEMS scanner) a refractive/diffractive medium coupled to the frame, and a plurality of photodiodes. In some implementations, the refractive/diffractive medium is configured to display content. The plurality of photodiodes may be configured in a spatial arrangement on a surface of the refractive/diffractive medium (in front of or behind), or embedded within the refractive/diffractive medium (e.g., FIG. 5C).

In some implementations, the refractive/diffractive medium includes a bias layer (e.g., bias (−), bias (+)). For example, for prescription lenses, the bias layer may be modified based on prescription. In some implementations, the plurality of photodiodes are configured in a spatial arrangement on a surface of the bias layer. For example, as illustrated in FIG. 5C, the plurality of photodiodes 530, 532, 534, 536 are attached to the bias (+) 548 layer of the lens 515 within the air gap 547. Alternatively, as illustrated in FIG. 5D, the plurality of photodiodes 530, 532, 534, 536 may be attached to the far-eye side of the lens 515. In some implementations, alternative configurations and placements of the photodiodes 530, 532, 534, 536 may be utilized provided that the size of the components are not perceptible to the eye when the HMD is worn by a user (e.g., less than 200 micrometers in diameter, or even smaller such as 100 μm, 50 μm, 25 μm, 5 μm, etc.). In other words, the photodiodes 530, 532, 534, 536, and any connections (e.g., transparent conductors) that connect the photodiodes to another component, such as a controller, appear invisible to a human eye.

In some implementations, the set of photodiodes (e.g., photodiodes 530, 532, 534, 536) are positioned behind the refractive/diffractive medium, as illustrated in FIG. 5D. Alternatively, in some implementations, the set of photodiodes are embedded within the refractive/diffractive medium. For example, as illustrated in FIG. 5C, the photodiodes 530, 532, and the like, are embedded within the refractive/diffractive medium (e.g., lens 515) and positioned in the air gap 547 between the waveguide 546 and the bias (+) 548. In some implementations, the photodiodes 530, 532, and the like, and transparent conductors connecting the photodiodes to a controller (e.g., a power source and a processor) are embedded within or on top of the waveguide 546.

Figure 7:
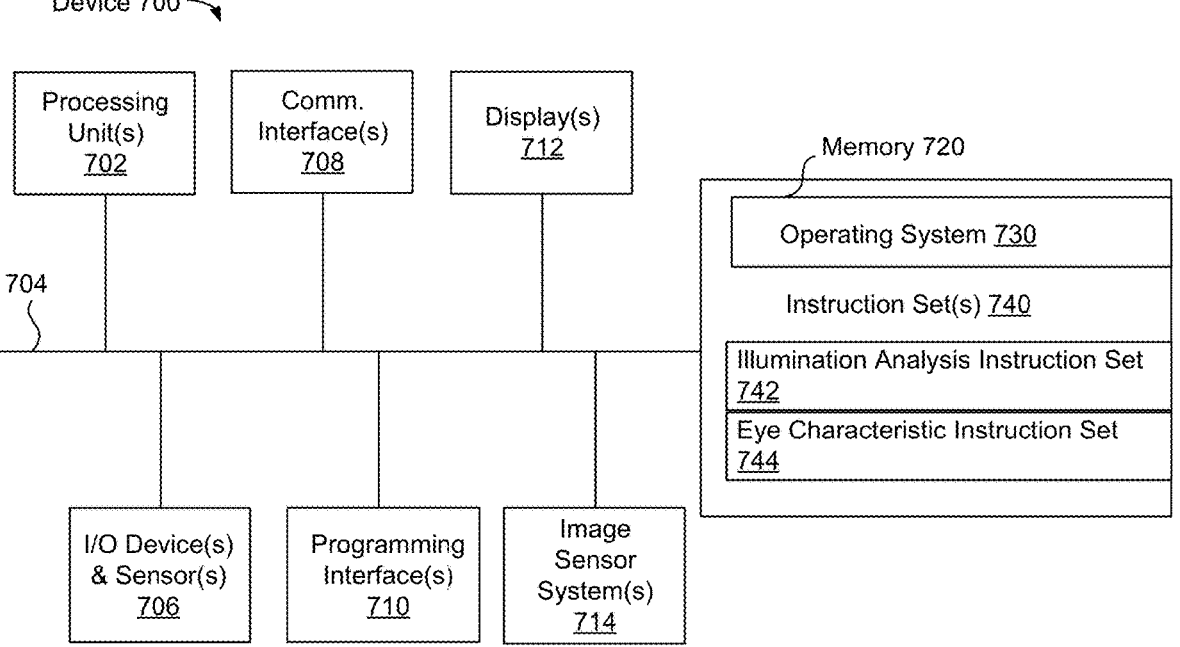
FIG. 7 illustrates device components of an exemplary device in accordance with some implementations.

FIG. 7 is a block diagram of an example device 700. Device 700 illustrates an exemplary device system configuration for a device (e.g., devices 105, 125, 165, etc.). While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 700 includes one or more processing units 702 (e.g., microprocessors, ASICs, FPGAs, GPUS, CPUs, processing cores, and/or the like), one or more input/output (I/O) devices and sensors 706, one or more communication interfaces 708 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, 12C, and/or the like type interface), one or more programming (e.g., I/O) interfaces 710, one or more displays 712, one or more interior and/or exterior facing image sensor systems 714, a memory 720, and one or more communication buses 704 for interconnecting these and various other components.

In some implementations, the one or more communication buses 704 include circuitry that interconnects and controls communications between system components. In some implementations, the one or more I/O devices and sensors 706 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 712 are configured to present a view of a physical environment or a graphical environment to the user. In some implementations, the one or more displays 712 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 712 correspond to diffractive, reflective, polarized, holographic, etc. waveguide displays. In one example, the device 105 includes a single display. In another example, the device 105 includes a display for each eye of the user.

In some implementations, the one or more image sensor systems 714 are configured to obtain image data that corresponds to at least a portion of the physical environment. For example, the one or more image sensor systems 714 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 714 further include illumination sources that emit light, such as a flash. In various implementations, the one or more image sensor systems 714 further include an on-camera image signal processor (ISP) configured to execute a plurality of processing operations on the image data.

The memory 720 includes high-speed random-access memory, such as DRAM, SRAM, DDR RAM, or other random-access solid-state memory devices. In some implementations, the memory 720 includes non-volatile memory, such as one or more magnetic disk storage devices, optical disk storage devices, flash memory devices, or other non-volatile solid-state storage devices. The memory 720 optionally includes one or more storage devices remotely located from the one or more processing units 702. The memory 720 includes a non-transitory computer readable storage medium.

In some implementations, the memory 720 or the non-transitory computer readable storage medium of the memory 720 stores an optional operating system 730 and one or more instruction set(s) 740. The operating system 730 includes procedures for handling various basic system services and for performing hardware dependent tasks. In some implementations, the instruction set(s) 740 include executable software defined by binary information stored in the form of electrical charge. In some implementations, the instruction set(s) 740 are software that is executable by the one or more processing units 702 to carry out one or more of the techniques described herein.

The instruction set(s) 740 include an illumination analysis instruction set 742 and an eye characteristic instruction set 744. The instruction set(s) 740 may be embodied a single software executable or multiple software executables.

In some implementations, the illumination analysis instruction set 742 is executable by the processing unit(s) 702 to produce a reflection by directing light towards an eye using a scanning light source (e.g., a MEMS scanner), receive sensor data from a sensor (e.g., a set of one or more photodiodes) and determine a reflective property (e.g., a spectral property) of the reflection based on the sensor data. To these ends, in various implementations, the instruction includes instructions and/or logic therefor, and heuristics and metadata therefor.

In some implementations, the eye characteristic instruction set 744 is executable by the processing unit(s) 702 to determine a characteristic of the eye based on the sensor data such as identifying and tracking a position and/or orientation of an eye, a gaze direction, the cornea shape, and the like, using one or more of the techniques discussed herein or as otherwise may be appropriate. To these ends, in various implementations, the instruction includes instructions and/or logic therefor, and heuristics and metadata therefor.

Although the instruction set(s) 740 are shown as residing on a single device, it should be understood that in other implementations, any combination of the elements may be located in separate computing devices. Moreover, FIG. 7 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Figure 8:
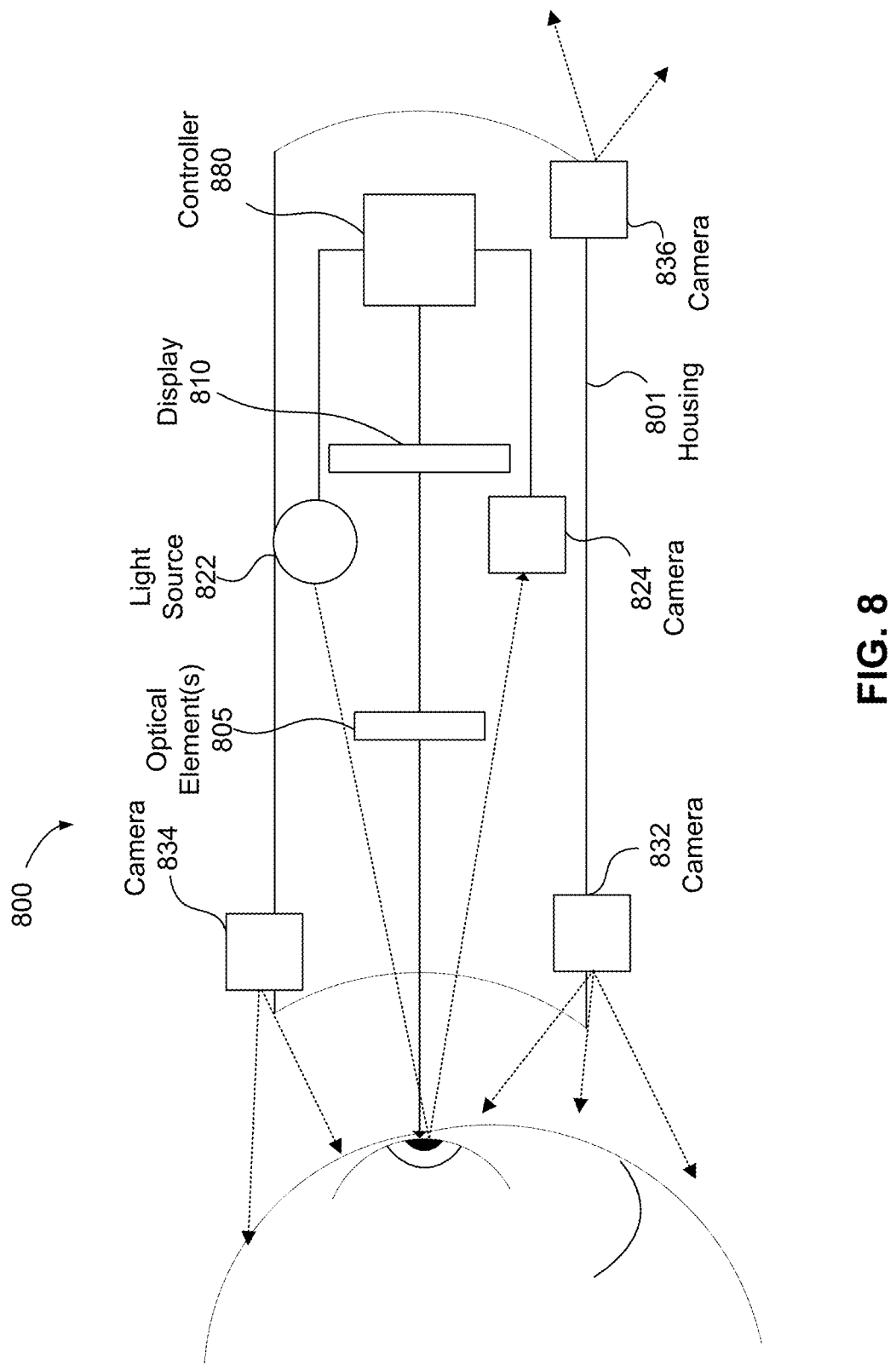
FIG. 8 illustrates an example HMD in accordance with some implementations.

FIG. 8 illustrates a block diagram of an exemplary head-mounted device 800 in accordance with some implementations. The head-mounted device 800 includes a housing 801 (or enclosure) that houses various components of the head-mounted device 800. The housing 801 includes (or is coupled to) an eye pad (not shown) disposed at a proximal (to the user) end of the housing 801. In various implementations, the eye pad is a plastic or rubber piece that comfortably and snugly keeps the head-mounted device 800 in the proper position on the face of the user 110 (e.g., surrounding the eye of the user).

The housing 801 houses a display 810 that displays an image, emitting light towards or onto the pupil of an eye of a user. In various implementations, the display 810 emits the light through an eyepiece having one or more optical elements 805 that refracts the light emitted by the display 810, making the display appear to the user to be at a virtual distance farther than the actual distance from the eye to the display 810. For example, optical element(s) 805 may include one or more lenses, a waveguide, other diffraction optical elements (DOE), and the like. For the user to be able to focus on the display 810, in various implementations, the virtual distance is at least greater than a minimum focal distance of the eye (e.g., 7 cm). Further, in order to provide a better user experience, in various implementations, the virtual distance is greater than 1 meter.

The housing 801 also houses a tracking system including one or more light sources 822, camera 824, camera 832, camera 834, camera 836, and a controller 880. The one or more light sources 822 emit light onto the eye of the user that reflects as a light pattern (e.g., a circle of glints) that can be detected by the camera 824. Based on the light pattern, the controller 880 can determine an eye tracking characteristic of the user. For example, the controller 880 can determine a gaze direction or a blinking state (eyes open or eyes closed) of the user. As another example, the controller 880 can determine a pupil center, a pupil size, or a point of regard associated with the pupil. Thus, in various implementations, the light is emitted by the one or more light sources 822, reflects off the eye of the user, and is detected by the camera 824. In various implementations, the light from the eye of the user is reflected off a hot mirror or passed through an eyepiece before reaching the camera 824.

The display 810 emits light in a first wavelength range and the one or more light sources 822 emit light in a second wavelength range. Similarly, the camera 824 detects light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm).

In various implementations, eye tracking (or, in particular, a determined gaze direction) is used to enable user interaction (e.g., the user selects an option on the display 810 by looking at it), provide foveated rendering (e.g., present a higher resolution in an area of the display 810 the user is looking at and a lower resolution elsewhere on the display 810), or correct distortions (e.g., for images to be provided on the display 810).

In various implementations, the one or more light sources 822 emit light towards the eye of the user, which reflects in the form of a plurality of glints.

In various implementations, the camera 824 is a frame/shutter-based camera that, at a particular point in time or multiple points in time at a frame rate, generates an image of the eye of the user. Each image includes a matrix of pixel values corresponding to pixels of the image which correspond to locations of a matrix of light sensors of the camera. In implementations, each image is used to measure or track pupil dilation by measuring a change of the pixel intensities associated with one or both of a user's pupils.

In various implementations, the camera 832, camera 834, and camera 836 are frame/shutter-based cameras that, at a particular point in time or multiple points in time at a frame rate, can generate an image of the face of the user 110 or capture an external physical environment. For example, camera 832 captures images of the user's face below the eyes, camera 834 captures images of the user's face above the eyes, and camera 836 captures the external environment of the user (e.g., environment 100 of FIG. 1). The images captured by camera 832, camera 834, and camera 836 may include light intensity images (e.g., RGB) or depth image data (e.g., Time-of-Flight, infrared, etc.).

A physical environment refers to a physical world that people can sense or interact with without aid of electronic devices. The physical environment may include physical features such as a physical surface or a physical object. For example, the physical environment corresponds to a physical park that includes physical trees, physical buildings, and physical people. People can directly sense or interact with the physical environment such as through sight, touch, hearing, taste, and smell. In contrast, an extended reality (XR) environment refers to a wholly or partially simulated environment that people sense or interact with via an electronic device. For example, the XR environment may include augmented reality (AR) content, mixed reality (MR) content, virtual reality (VR) content, or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of physiological data to improve a user's experience of an electronic device with respect to interacting with electronic content. The present disclosure contemplates that in some instances, this gathered data may include personal information data that uniquely identifies a specific person or can be used to identify interests, traits, or tendencies of a specific person. Such personal information data can include physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve interaction and control capabilities of an electronic device. Accordingly, use of such personal information data enables calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information or physiological data will comply with well-established privacy policies or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying or personal information about the user, such as a legal name, username, time and location data, or the like). In this way, other users, hackers, or third parties cannot determine the identity of the user associated with the stored data. In some implementations, a user may access his or her stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. An electronic device comprising:
a scanning light source capable of projecting light in a plurality of different directions over time;
a set of one or more photodiodes;
a refractive/diffractive medium having a near-eye side and a far-eye side, wherein, when the electronic device is worn, the near-eye side is proximate an eye of a user and the far-eye side is an opposite side of the refractive/diffractive medium such that light projected by the scanning light source that is reflected by the eye passes through the refractive/diffractive medium before capture by the set of one or more photodiodes, wherein the set of the one or more photodiodes are positioned within or in contact with the refractive/diffractive medium; and
a processor configured to perform operations comprising:
receiving sensor data from the set of one or more photodiodes, the sensor data corresponding to a plurality of reflections of light produced by the scanning light source and reflected from the eye; and
determining a characteristic of the eye based on the sensor data.

2. The device of claim 1, wherein the scanning light source is positioned behind the far-eye side of the refractive/diffractive medium and configured to project light towards the eye through the refractive/diffractive medium.

3. The device of claim 1, wherein the set of the one or more photodiodes are positioned proximate the far-eye side of the refractive/diffractive medium.

4. The device of claim 1, wherein the set of the one or more photodiodes are positioned proximate to the near-eye side of the refractive/diffractive medium.

5. The device of claim 1, wherein the set of the one or more photodiodes are positioned within the refractive/diffractive medium.

6. The device of claim 1, wherein the set of the one or more photodiodes are positioned between the far-eye side of the refractive/diffractive medium and a display portion of the device.

7. The device of claim 1, wherein the set of the one or more photodiodes are positioned within a display portion of the device.

8. The device of claim 1, wherein determining the characteristic of the eye based on the sensor data comprises determining at least one of a phase, an intensity, an angle, a timing, and a polarization of the light.

9. The device of claim 1, wherein determining the characteristic of the eye based on the sensor data comprises determining a position of a pupil of the eye.

10. The device of claim 1, wherein determining the characteristic of the eye based on the sensor data comprises determining a gaze direction based on a detected reflection angle.

11. The device of claim 10, wherein the processor is further configured to initiate an action based on detecting that the gaze direction is approximately oriented towards a target area.

12. The device of claim 1, wherein determining the characteristic of the eye based on the sensor data comprises determining a shape of the eye.

13. The device of claim 1, wherein the scanning light source is one of a plurality of scanning light sources coupled to the electronic device.

14. The device of claim 1, wherein the electronic device is a head-mounted device (HMD).

15. An electronic device comprising:

a scanning light source capable of projecting light in a plurality of different directions over time;

a set of one or more photodiodes;

a refractive/diffractive medium having a near-eye side and a far-eye side, wherein, when the electronic device is worn, the near-eye side is proximate an eye of a user and the far-eye side is an opposite side of the refractive/diffractive medium such that light projected by the scanning light source that is reflected by the eye passes through the refractive/diffractive medium before capture by the set of one or more photodiodes, wherein the set of the one or more photodiodes are positioned behind, in front of, or embedded within the refractive/diffractive medium;

an adaptive polarization control unit;

an adaptive sensor;

a refractive component; and a processor configured to perform operations comprising:

receiving sensor data from the set of one or more photodiodes, the sensor data corresponding to a plurality of reflections of light produced by the scanning light source and reflected from the eye; and determining a characteristic of the eye based on the sensor data, wherein the adaptive polarization control unit is configured to:

receive, from the adaptive sensor, light from the scanning light source reflected from the refractive component;

determine a property associated with the light; and modify and reflect the light to the eye via the adaptive sensor.

16. The device of claim 1, further comprising a spatial light module.

17. The device of claim 16, wherein the processor is further configured to perform operations comprising:

receiving spatial light data from the spatial light module, the spatial light data corresponding to the plurality of reflections of light produced by the scanning light source and reflected from the eye that are passed through the spatial light module;

determining a phase state of the sensor data from the set of one or more photodiodes; and modifying a phase of the projected light from the scanning light source based on one or more phase modification techniques.

18. A method comprising:

at an electronic device having a processor:

producing light from a scanning light source capable of projecting light in a plurality of different directions over time toward an eye, wherein the scanning light source is configured in a spatial arrangement associated with a refractive/diffractive medium, and wherein the refractive/diffractive medium comprises a near-eye side and a far-eye side such that when the electronic device is worn, the near-eye side is proximate an eye of a user and the far-eye side is an opposite side of the refractive/diffractive medium;

receiving sensor data from a set of one or more photodiodes, the sensor data corresponding to a plurality of reflections of light produced by the scanning light source and reflected from the eye, wherein the light that is reflected by the eye passes through the refractive/diffractive medium before capture by the set of one or more photodiodes, wherein the set of the one or more photodiodes are positioned within or in contact with the refractive/diffractive medium; and determining a characteristic of the eye based on the sensor data.

19. The method of claim 18, wherein the scanning light source is positioned behind the far-eye side of the refractive/diffractive medium and configured to project light towards the eye through the refractive/diffractive medium.

20. The method of claim 18, wherein the set of the one or more photodiodes are positioned proximate to the far-eye side of the refractive/diffractive medium.

21. The method of claim 18, wherein the set of the one or more photodiodes are positioned proximate to the near-eye side of the refractive/diffractive medium.

22. The method of claim 18, wherein the set of the one or more photodiodes are positioned within the refractive/diffractive medium.

23. The method of claim 18, wherein the set of the one or more photodiodes are positioned between the far-eye side of the refractive/diffractive medium and a display portion of the device.

24. A non-transitory computer-readable storage medium, storing program instructions executable on a device including one or more processors to perform operations comprising:

producing light from a scanning light source capable of projecting light in a plurality of different directions over time toward an eye, wherein the scanning light source is configured in a spatial arrangement associated with a refractive/diffractive medium, and wherein the refractive/diffractive medium comprises a near-eye side and a far-eye side such that when an electronic device is worn, the near-eye side is proximate an eye of a user and the far-eye side is an opposite side of the refractive/diffractive medium;

receiving sensor data from a set of one or more photodiodes, the sensor data corresponding to a plurality of reflections of light produced by the scanning light source and reflected from the eye, wherein the light that is reflected by the eye passes through the refractive/diffractive medium before capture by the set of one or more photodiodes, wherein the set of the one or more photodiodes are positioned within or in contact with the refractive/diffractive medium; and determining a characteristic of the eye based on the sensor data.

* * * * *